(12) United States Patent
Carricarte

(10) Patent No.: US 10,949,866 B2
(45) Date of Patent: Mar. 16, 2021

(54) SYSTEM AND METHOD FOR REAL TIME PARTICIPANT ENGAGEMENT AND TWO-WAY COMMUNICATION

(71) Applicant: Louis M. Carricarte, Doylestown, PA (US)

(72) Inventor: Louis M. Carricarte, Doylestown, PA (US)

( * ) Notice: Subject to any disclaimer, the term of this patent is extended or adjusted under 35 U.S.C. 154(b) by 8 days.

(21) Appl. No.: 15/981,865

(22) Filed: May 16, 2018

(65) Prior Publication Data

US 2018/0341961 A1    Nov. 29, 2018

Related U.S. Application Data

(63) Continuation-in-part of application No. 14/057,454, filed on Oct. 18, 2013, now abandoned.

(51) Int. Cl.
| | |
|---|---|
| *H04L 29/06* | (2006.01) |
| *H04W 4/21* | (2018.01) |
| *H04L 29/08* | (2006.01) |
| *G06Q 30/02* | (2012.01) |
| *G06Q 50/00* | (2012.01) |

(52) U.S. Cl.
CPC ..... *G06Q 30/0203* (2013.01); *G06Q 30/0201* (2013.01); *G06Q 30/0282* (2013.01); *G06Q 50/01* (2013.01); *H04L 65/4053* (2013.01); *H04W 4/21* (2018.02); *H04L 67/22* (2013.01)

(58) Field of Classification Search
CPC ............... G06Q 30/0203; G06Q 50/01; G06Q 30/0201; G06Q 30/0282; H04W 4/21; H04L 65/4053; H04L 67/22
See application file for complete search history.

(56) References Cited

U.S. PATENT DOCUMENTS

| | | | |
|---|---|---|---|
| 8,732,605 B1* | 5/2014 | Falaki | G06Q 30/02 715/780 |
| 10,129,211 B2* | 11/2018 | Heath | G06Q 10/10 |
| 2008/0120129 A1* | 5/2008 | Seubert | G06Q 10/10 705/35 |
| 2011/0082746 A1* | 4/2011 | Rice | H04W 4/21 705/14.56 |
| 2013/0157693 A1* | 6/2013 | Mercuri | H04W 4/029 455/456.3 |
| 2013/0339875 A1* | 12/2013 | Sahai | H04L 12/1827 715/753 |

* cited by examiner

*Primary Examiner* — Davoud A Zand

(57) ABSTRACT

Disclosed is a system and method of real time collection, display and analysis of participant engagement data, including but not limited to feedback data, which system and method enables two-way communication between a client wishing to collect, analyze and measure participant engagement data and each of multiple participants on a one-to-one basis (client directly to participant), including an interactive client dashboard with customizable data display and analysis tools and "speak" capabilities including creating automated messages and creating custom messages "on the fly" to respond to feedback received by directly messaging selected cohorts of participants.

15 Claims, 9 Drawing Sheets

SYSTEM AND METHOD FOR REAL TIME PARTICIPANT ENGAGEMENT AND TWO-WAY COMMUNICATION

STATEMENT REGARDING FEDERALLY SPONSORED RESEARCH OR DEVELOPMENT

The present invention was not developed with the use of any Federal Funds but rather was developed independently by the inventor.

CROSS-REFERENCE TO RELATED PATENTS AND APPLICATIONS

This application claims the benefit of prior nonprovisional patent application Ser. No. 14/057,454 filed Oct. 18, 2013. The prior nonprovisional patent application is incorporated herein by this reference as though fully set forth herein.

FIELD OF THE INVENTION

The present invention relates generally to the field of mobile applications and to a system and method of participant engagement and two-way communication where the data from multiple participants is collected, aggregated and transmitted in real time for viewing and action on a secure server via an interactive user dashboard for analysis and action, and where the viewing user may respond in real time to multiple participants, or selected cohorts of participants.

BACKGROUND

Social and commercial user interaction has become a critical tool for entities (brands, companies, celebrities, organizations, for example) in understanding the social and commercial landscape in which they operate. People are the sustainable resource in this age of disruptive innovation, fast-paced change and fluidly shifting markets. Electronic communication has quickened to the point of being nearly instantaneous. User friendly and highly available access to information portals represents a competitive advantage. Instant online communication creates valuable opportunities. It enables companies to harness knowledge about their customers. It enables the widespread dissemination of news. It spurs discussion and debate enabled by social media sites such as Twitter and others. Instant communication has even ventured into the political realm where it allows political parties to address and respond directly to the public and thereby to understand their constituents. With the multiple ways in which people are connected in today's business, political, and social climate, not knowing something within a relatively short period of time, such as an hour or less, puts one out of touch and at a disadvantage.

In certain instances, participants wish to remain anonymous when giving their input to a particular request, issue, event or situation. In such instances, anonymity is necessary in order to, first, obtain participant engagement in the process; and, second, to obtain accurate and realistic feedback from the individuals who choose to engage. An additional factor is the requirement for secure transmission of information supplied by the participants that creates a secure environment for digital content within such system.

Until now, certain systems for processing events and analyzing data in the social and commercial domains have been disclosed. For example, U.S. Pat. No. 8,504,397 to Vempati discloses a system that processes real time business event monitoring and tracking by a server, which receives data, typically through RFID or 802.11 (including Wi-Fi™) transmissions, from a number of data collection devices which, in turn, acquire input from individual users. The server analyzes the data in conjunction with previously input historical data and additional business or logistical rules and filters and identifies specific business events based on the analysis. Calculations of the collected data and resulting analyses are conducted in real time and sent back to the client on the same data collection device or a different display device. Vempati et al. does not provide for anonymity of the participants.

U.S. Pat. No. 7,937,416 to Hossfeld et al. discloses a data management system that aggregates data for a plurality of schools and universities. This data is systematized into categories. The patent does not disclose the anonymous submission of input by participants. U.S. Pat. No. 8,146,103 to Schmidt et al. teaches data aggregation as a means of interpreting business events. Schmidt et al. compare existing data to identify business events and provide a means for distributing this information back to a client. However, Schmidt et al. utilize preexisting business data and do not disclose the use of participant-generated real time data input.

U.S. Pat. No. 8,171,561 to Moskowitz et al. discloses a system containing encryption of data to enable anonymity of transaction flowing through a remote server. The invention is tailored towards secure transactions for use in the music industry. Moskowitz et al. recognize the possibility of users being able to access real time information, but here again the disclosure does not recognize the importance of real time aggregation and distribution of data to a client. U.S. Pat. No. 6,081,793 to Challener et al. discloses a system for the aggregation of data for voting events. The system maintains anonymity of participants. As voters send data, a server authenticates whether a voter is registered and is of proper age to vote. No disclosure is made as to the need for real time aggregation or dissemination of the data or results.

Other methods and/or systems include U.S. Pat. No. 7,318,049 to Iannacci for an interactive online, incentive-controlled system that finds useful patterns in data, with or without participant input; U.S. Pat. No. 7,172,118 to Urken discloses a system that aggregates and analyzes data for use in optimal decision-making scenarios in military applications; U.S. Patent Application No. 2005/0138642 to Breh et al. discloses a system and method for monitoring resources that send, filter, and aggregate low-level events in order to detect high-level events; and U.S. Pat. No. 6,754,704 to Prorock discloses a method of monitoring events in a data processing system with real time data distribution.

Falaki, U.S. Pat. No. 8,732,605 discloses a system for collecting public opinion data, aggregating it and displaying it but does not disclose any features or elements for real-time analysis or response. Rice, U.S. Patent Application 2011/0082746, discloses a system for providing location-based promotion and feedback services, but fails to disclose any elements to provide real-time analysis, refinement, feedback or communication.

While a multitude of systems and methods exist in the public domain relating to data collection, aggregation or interpretation, as well as systems and methods for anonymous user participation, a system for collecting, disseminating and displaying data in real time based on user input from participants, with the capability of speaking back to participants, or a selected group of participants in real time, with or without selectively encrypted characteristics has not previously been disclosed. The anonymous participant engagement measurement system of the present invention comprises a combination of components that provide value and advantage over the prior art.

SUMMARY OF THE INVENTION

The current invention is a method and system for real time collecting, displaying, analyzing and measuring participant engagement and feedback about an event, with the ability to communicate in real time to one or more selected cohorts of participants to request additional feedback for a refined understanding of the feedback, or to communicate in real time a special offer to that cohort, for example.

The method according to a preferred embodiment involves (a) providing to each of said participants a mobile application executable on a mobile device, (b) allowing each of said participants to input a command via said mobile application that indicates said participant's level of engagement in the moment to said event, (c) receiving on a data processing apparatus said command data from multiple participants, (d) aggregating said command data received from multiple participants, (e) providing to a client entity a software application capable of receiving and displaying in an interactive dashboard said aggregated command data from multiple participants, (f) said software application receiving said aggregated command data from said data processing apparatus, and (g) displaying said aggregated command data in said interactive dashboard. In addition, according to a preferred embodiment, the interactive dashboard is capable of transmitting to said participant mobile device(s) messages created by said client entity, wherein said messages are created by the client entity in real time in response to aggregated engagement (command) data from multiple participants displayed in real time in the interactive dashboard. The messages may be sent automatically upon the occurrence of certain triggers. The mobile application according to a preferred embodiment displays at least one list of selectable places about which a participant may submit engagement data; at least one set of selectable categories corresponding to the place selected by said participant from said list of selectable places; and at least one set of selectable values corresponding to the category selected by said participant from said set of selectable categories.

An alternate embodiment of the system which additionally provides anonymity for participants involves (a) providing to the participant a mobile application executable on a mobile device, (b) assigning a unique identifier to the participant using encryption software in the mobile application, (c) collecting information about each participant, which may include location-specific information, (d) allowing said participant to input a command via the mobile application that indicates the participant's feedback about the event or level of engagement to the event, (f) receiving on a data processing apparatus the command data from multiple participants, (g) aggregating in real time the command data received from multiple participants, (h) transmitting in real time the aggregated data to a server which is in communication with an interactive dashboard viewable by an entity, whereby the entity can in real time display, interpret and analyze the data in various ways according to various parameters; and whereby the entity can in real time select cohorts for additional communication and refinement; and whereby the entity can in real time create and push a message to the selected cohort(s), which message may be a request for additional feedback to refine the entity's understanding of the feedback, or which message may be a special offer for that cohort, such as a discount code, coupon or special purchase opportunity.

Another embodiment involves (a) obtaining a participant's "opt in"; (b) providing to the opted-in participant a mobile application executable on a mobile device, (c) assigning a unique identifier to the participant or collecting a User ID from the participant; (d) allowing said participant to input a command via the mobile application that indicates the participant's level of emotional engagement to the event, and sending said command data along with participant data, including, for example, participant ID, geolocation data and timestamp (e) receiving on a data processing apparatus the command data, along with participant data, from multiple participants, (f) aggregating the command data and participant data received from multiple participants, (g) transmitting the aggregated command data and participant data to an interactive client dashboard, wherein the identity of each participant remains anonymous and wherein a client can view, analyze and interpret in real time the aggregated data received from the participants in relation to the characteristics of the participants, or in relation to the particular engagement data received, or in relation to other data of interest to an entity, such as, for example, specific location information about where the participant's device was physically located when the participant was submitting the engagement data, (h) enabling an entity to select cohorts of participants by grouping participants who submitted similar engagement data, or participants with similar demographic characteristics, or participants whose engagement data indicates certain preferences, or grouping participants by other similarities; (i) enabling an entity to create a message in real time to respond to engagement data received from one or more selected cohorts of participants, and to transmit said message to said cohorts via the mobile software application on their mobile devices; (j) enabling said participants to respond in real time to said message by, for example, providing refined feedback; (k) transmitting command data corresponding to said feedback along with participant data to a data server where it is aggregated with command data and participant data of multiple participants as in step (f), and transmitting the aggregated command data to an interactive client dashboard as in step (g); and (i) measuring performance of said messages in real time.

A system to carry out the methods of the invention is also provided.

DETAILED DESCRIPTION OF THE INVENTION

Figure 1:
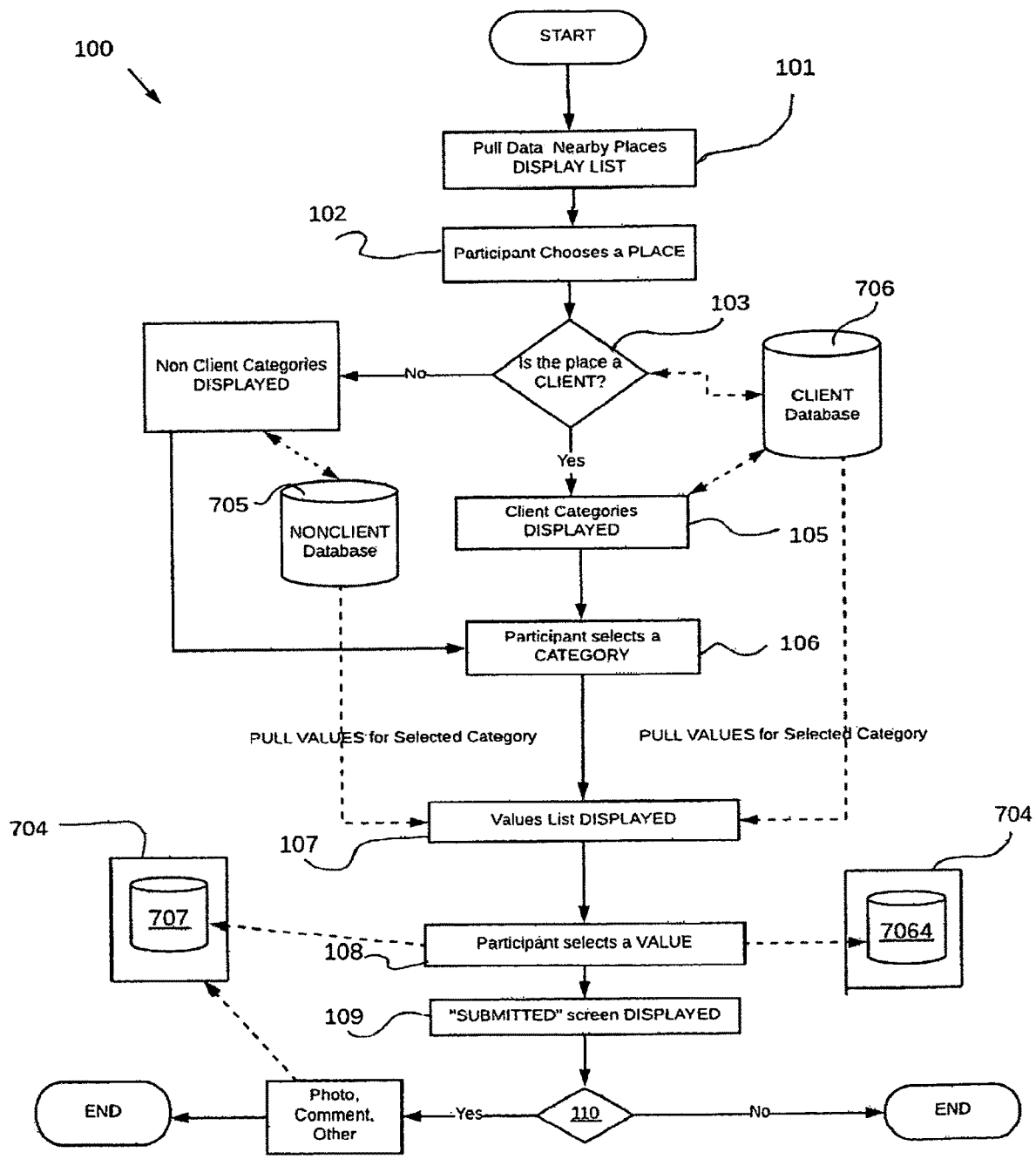
FIG. 1 is a diagram of a participant engagement process according to a preferred embodiment, with communication shown in dashed lines.

Disclosed herein is a method for capturing, analyzing, refining and measuring anonymous participant engagement, in real time, to an event and communicating, to selected cohorts of participants in response to their engagement characteristics.

Participant engagement includes simple feedback such as indications of a participant's interest, approval or disapproval or participant's emotional response, and also includes more specific or directed types of participant feedback as may be requested by the client entity. It is anticipated that the present invention is useful to any and all kinds of entities, public and private, large and small, including, but not limited to organizational, commercial, "business-to-business", governmental, educational, scholarly, scientific, military, sports club or team, entertainment, community, political, or religious, for example. Within the scope of the invention, such an entity will be referred to as a "client". The client herein is an entity that is interested in obtaining certain information from a particular group or groups of individuals, the participants. As referred to herein, "participant" means any human individual who is a customer or potential customer of a client, or who is a member of a group or part of a client (such as, for example, an employee of a client, a voter registered with a political party, a faculty member or a student of a university, a team member of a sports team). According to the system and method of the invention, as referred to herein, the term "event" is meant to include any and all types of occurrences, activities, situations, scenarios, conditions or other circumstances which an individual may observe, have knowledge of or with which the individual may be somehow involved—in other words, as referred to herein, an event in which a participant may be "engaged". As used herein, an event may be, for example, a participant having a meal in a client restaurant.

According to the system and method of the invention, one of the objects of the invention is to obtain participant input in real time, while the participant is still experiencing or engaging in a particular event, allowing the participant to provide real time input via a mobile application in response to the event or an aspect of the event, then relaying that real time input to the client while the client still has an opportunity to respond to the input while the participant is still present, in one or more of several ways, including, for example: 1) by causing something to happen in the real world (example: sending a worker to clean up a mess reported by a participant), or 2) by pushing a message to the participant seeking additional, refined feedback (example: to all participants complaining about the food in a restaurant, sending a follow-up feedback request asking for more information about what they did not like—Temperature? Texture? Too salty? Portion too small?), or 3) by pushing a message to the participant with a special offer (example: a 50% discount coupon on the meal which they can use immediately), or 4) by taking some other kind of immediate action in response to participants' real-time feedback.

The mobile application wirelessly transmits the participant's input to a remote server, herein called the "data server". The "input" is an artificially generated propagated wirelessly transmitted signal that is generated to encode information for transmission to a suitable receiver data processing apparatus.

The system is not limited by the number of inputs the system can receive. Input data is collected on data processing apparatus from multiple participants who engage in the same event and other events. For example, input data is collected on data processing apparatus from multiple participants who are having a meal in the same client establishment at the same time. The data is concurrently aggregated in the data server for real-time analysis. The data server is in communication with an interactive client dashboard whereby a client can, in real time, visualize the participant data displayed in a variety of different ways, grouped in a variety of different ways, with the ability to organize and analyze the data in real time to, for example, zoom in, study, and select certain cohorts grouped by characteristics as desired, including, for example, the cohort of people who gave a certain kind and/or degree of feedback about a certain event or portion of an event at the same time. It should be understood that "aggregated" as used herein means aggregating and organizing data from multiple participants into a data structure by data analysis criteria.

As used herein, "characteristics" is not limited to fixed or relatively stable facts, such as demographic information (gender or age, for example), but also includes ephemeral facts and data, such as the fact that a participant engaged in a particular event at a particular time and place as well as the data corresponding to the values selected and submitted by the participant in response to the event (which ephemeral facts and data are sometimes herein referred to as "engagement characteristics" to differentiate them from demographic characteristics). As used herein, a "cohort" means any group of participants who share a characteristic, such as all participants who are presently having a meal in the same client establishment, or all participants who are presently having a meal in the same client establishment who have submitted a negative value with respect to the category "food".

Once a cohort of participants has been selected, the client can in real time respond to the selected cohort in one or may ways as described above, including to create a message to push to the selected cohort, which message may be a request for more specific feedback to refine the client's understanding of the participant's feedback, or which message might be an offer for a discount or special shopping deal, or which message might be an apology or public service message. In addition, a client may create in advance automated messages to be sent automatically to cohorts in response to selected categories and values submitted by participants in said cohort(s) For example, a client may create an automated message to be sent only to new participants in response to the new participant's first engagement data submitted about the client, such as a welcome message or thank you message sent to all participants recognized as new to the client.

The features of real-time engagement and two-way communication are key features of the method. The ability to enter into a real-time "conversation" with a cohort of participants who have provided engagement data provides valuable insights and opportunities to the client and also makes the participant feel their feedback is being heard and that the client cares about the participants' experience. Moreover, the ability for a client to change categories, values and messages "on the fly" using the interactive client dashboard is an key feature of the method. These advantages are not adequately achieved by current systems providing delayed feedback via surveys and delayed, generic communications by the client via rewards systems and the like.

The method according to some embodiments includes (a) providing to the participant a mobile software application executable on a mobile device, (b) assigning a unique identifier to the participant, which may be done using encryption software in the mobile application or by other means such as collecting a User ID from the participant, (c) collecting information about each participant, which may be done actively, such as by asking the participant for the information, and/or passively, such as collecting location information from the participant's mobile device geolocator technology, (d) allowing the participant to input a command via the mobile application that indicates the participant's engagement to the event, which engagement may be emotional feedback about the event or about an aspect of the event (e) receiving on a server the data transmitted by multiple participants and aggregating the data received, (g) generating an interactive report of the data, (h) providing the interactive report to the client via an interactive client dashboard, wherein the identity of each participant remains anonymous to the client, and wherein the client may in real time analyze and view the data in various ways and group the data in various ways to reveal useful information and patterns; (i) allowing the client in real time to select one or more cohorts of participants according to commonality of characteristics or engagement values, (j) allowing the client to create a responsive message to be transmitted to selected cohorts, and (k) transmitting to selected cohorts client's responsive message in real time via the mobile application.

Alternatively, following step (e), aggregated participant input data is transmitted to a client server for analysis, interpretation and display, analyzed for certain criteria and a report with interpreted results is generated. The report is then provided to the client in real time without the identification of the participants. The system of the invention is not limited by any number of calculations or analyses performed by the software.

By the term "engagement" herein is meant that a participant provides feedback or input to an event via the mobile application, which instantaneously transmits that input data to a remote server. The term "real time" as used herein means instantaneously, simultaneously or immediately. In the case of participant engagement, the input is submitted via the mobile application preferably simultaneously as a given event is occurring, or within a relatively short period of time, preferably within seconds or minutes of the event. In the case of providing the data to the interactive client dashboard, it is anticipated that the data is transmitted virtually simultaneously as soon as it is received by the data server. Though the system and method are operable after some period of time even if not immediate, the usefulness of the system and method disclosed is diminished as time passes simply because instant or prompt information may have greater importance with respect to an actionable solution or plan by the client. Over time, the collection of real time data allows normalization of results, adds validity to the process, and can be used to compare with historic or key performance indicators. This will also allow users to establish trends over time.

One aspect of some embodiments of the method is that prior to participant engagement, certain participant data is recorded relating to any given set of desired characteristics of interest set forth by the client. Each participant may be assigned a unique identifier. The identity of the participant may then be encrypted and remain unknown to the client. The system includes an encryption module for encrypting or otherwise securitizing data obtained from each participant. Therefore, accompanying the input with each and every transmission is an anonymous identifier uniquely associated with the individual participant who created the input. This identifier can be any series of numbers, letters, symbols, and characters, whose level of encryption can vary with the size of the client. The data processing apparatus associates the unique identifier with different categories or segments of interest to the client. For an employer or organization, segments of interest recorded for each participant may include, but not be limited to, participant's physical location, department in which the participant is employed, participant's position level within the company, participant's political party or affiliation. Other characteristics of interest in embodiments of the invention can include age, sex, race, years of education attained, salary, geographic territory, market segment, price, strategic business unit, brand, or political party and other factors that could be correlated in order to inform the client regarding certain segments of interest. Other characteristics of interest in some embodiments of the invention may include participant's preferences and interests as may be suggested by the apps and settings on their mobile device or tracking technology already being used as is known in the art. Other embodiments of the invention may place a high value on participant privacy and anonymity, and in such embodiments a minimum of participant information is collected prior to participant engagement and a high degree of control is offered to the participant over the privacy of their information during the setup process.

The data processing apparatus corresponds the transmitted input and unique identifier of each participant with the particular characteristics of the individual participant. The data is recorded by the data processing apparatus, encrypted by encryption software, and remains unknown by the business or entity in which the participant is involved, thereby ensuring that participant anonymity is protected.

Once participant data is aggregated, it is an aspect of some embodiments of the invention that the data is correlated and interpreted with respect the given participant characteristics to determine key performance or economic indicators to create information useful to the client. In some embodiments, it is an important aspect of the invention that participants remain anonymous in order to effectuate greatest participant engagement level and accuracy of participant feedback to a given event. In other embodiments of the invention, including a preferred embodiment illustrated and described in detail herein, it is contemplated that interpretation and analysis of participant engagement data is accomplished by the client in real time using an interactive client dashboard, requiring a minimum amount of data processing at the data server level with a focus on transmitting aggregated data to be displayed on the interactive client dashboard in a continuous or near continuous flow. In this way, the real time functionality, a key object of the invention, is preserved.

According to the invention, participant input is recorded by a mobile software application previously downloaded on the mobile device of the participant. The mobile device according to the invention is equipped with wireless connectivity. In the preferred embodiment, the mobile software application is as simple as a single depression of an icon or button by the participant that are commonly provided by mobile apps. In a preferred embodiment, the mobile application comprises two icons or buttons or a small series of icons or buttons to capture the participant's engagement in a way that requires very little time or thought by the participant, the object being to easily capture the participant's true feedback about the event or an aspect of the event in the moment. These simple commands generate data in the form of the participant's emotionally driven input. This input stems from a thought, emotion, or feeling, and manifests as a complaint, suggestion, or other form of information to the client. The icon itself may be a "thumbs up" or a "thumbs down" depiction, a check mark, a number, a color, or any other suitable graphic or design element whatsoever that indicates a thought, emotion or feeling. The level of engagement can be measured by the number of depressions of the mobile application, i.e., the amount of input of the participant into the system, wherein the greater the number of depressions, the higher the level of participant engagement indicating greater emotion or feeling that the participant wishes to communicate. Along with the participant's selection command data, the mobile application transmits the encrypted identifier of the participant, (2) a timestamp of the input, and (3) a global positioning system (GPS) or other geolocation signal indicating the location of the input and transmission.

Embodiments of the invention and all of the functional operations described in this specification can be implemented in digital electronic circuitry, or in computer software, firmware, or hardware, including the structures described in this specification and their structural equivalents. Embodiments of the invention can be implemented as one or more modules of computer program instructions encoded on a computer readable medium, e.g., a machine readable storage device, a machine readable storage medium, a memory device, or a machine readable propagated signal, for execution by or to control the operation of data processing apparatus. The term "data processing apparatus" encompasses all apparatus, devices and machines for processing data, including, by way of example, a programmable processor, a computer, or multiple processors or computers. According to the invention, the data processing apparatus includes code that creates an execution environment for the computer program in question that enables aggregation, correlation and analysis of the input data.

The computer programs used in conjunction with the method and system of the invention, also commonly known as program, software, application, script, or code, can be written in any form of programming language, including compiled or interpreted languages, and can be deployed in any form, including as stand-alone programs or as a modules, components, subroutines, or other units suitable for use in a computer environment. The computer programs can be deployed to be executed on one computer, on multiple computers or servers that are located at one or distributed across multiple sites and interconnected by a communication network.

Furthermore, the processes described in this specification can be performed by one or more programmable processors executing one or more computer programs to perform functions by operating on the input data and generating the output data or report. Processors suitable for execution of the computer programs useful herein include microprocessors and any one or more processors of any kind of digital computer. The computer will also include or be operatively coupled to a communication interface to receive the input data or to which the input data is transferred, or both; and one or more mass storage devices for storing data, such as magnetic optical disks or optical disks.

According to the invention, the client receives the participant engagement data via the interactive client dashboard to enable the client to access, explore, analyze, interpret and respond to the engagement data in real time. Any means for receiving information, such as computers, dashboards, or any other display device are within the scope of the invention. To provide interaction with the user client, embodiments of the invention can be implemented on a computer wherein the display device, such as a touchscreen display or such other display technology as is known in the art for displaying information to a user. A user input mechanism such as a touchscreen, keyboard or pointing device by which the user can access the dashboard and provide input, as known in the art, according to the user's needs is also contemplated within the scope of the invention. The components of the system can be interconnected by any form or medium of digital data communication network, including for example, local area network (LAN) or a wide area network (WAN) such as the Internet. A secured network is preferred. The advantages of the invention are demonstrated by the examples below.

EXAMPLES

The following examples are set forth to illustrate the system and method of the invention and are intended to be purely exemplary of the use of the invention and should not be viewed as limiting in its scope. Tracking real-time engagement provides an imminent perspective and a long-term view to a client based on patterns of behavior and the correlated impact on key performance indicators of an organization. Value is realized as a map of real-time participant engagement emerges or trends normalize and create predictive analytics for nimble organizations to pivot towards an opportunity.

Example 1

An interactive application for a mobile device enables organizations to record the brand performance at a certain period in time. Capturing internal metrics provides a measurement of engagement based on the vision, values and the execution of brand strategy. The data fed from the market delivers metrics based on the delivery of the brand according to each customer's expectations. For example, the system of the invention can be used by a hotel chain with seven brands that span the breadth of the market. Each brand is designed to attract and retain a targeted segment. According to the invention, loyalty members would be provided access to the mobile application supplied by the hotel as part of the loyalty program to be used during their stay for recording engagement as they participate with the family of brands. The hotel would define the characteristics for each loyal customer to include demographic, financial and psychographics segments. A loyal group of willing participants will express themselves based on the performance of the brand versus their expectations. The engagement data may be aggregated and displayed in the interactive client dashboard where it may be correlated against the areas of importance to the organization's at that time, which areas of importance may be changed by the organization on the fly as needed. Brand performance, guest tendencies by targeted segments and the ability to quantify company engagement efforts are examples of analytics that can be delivered by the system of the invention to the hotel chain to effectuate real time engagement and value.

Example 2

Another embodiment illustrating applicability of the invention occurs with any manufacturer of large lifestyle products such as boats, motorcycles, cars, trucks and the like which offer a selection of products and options to earn share in the market. Each of the products are targeted for a segment, or multiple segments, of a market based on the behavioral characteristics of an individual participant. These types of manufacturers have a number of tools and reports used to track the historical trends of its target market. The missing dimension until now was the lack of data available indicating real-time feedback regarding use of the product. It is often a practice in the industry that after a major purchases, the manufacturing organization will conduct a survey where a willing participant completes a form after some significant passage of time. With real-time engagement according to the invention, the customer can provide input in real-time as the customer acquires ownership and during the lifecycle of the product. Information for each market segment will reflect true brand performance based on the expectations of the segment. Companies can use the trends and analysis to sharpen the position of the products, adjust communication to the desired attributes or develop new products to fill the emerging niche of the segment. Businesses can use this data to adjust product and service offerings to align with the demands of the segment.

Example 3

In another embodiment, the participants are guest of a particular establishment or venue. Guest engagement tracked in real time can be used to create heat maps as a guest moves throughout a venue. These events can include theme park visits, conferences, tradeshows, sporting events and vacations. As engagement escalates in regions of a map, the host can investigate, communicate and mitigate the situation and take advantage to strengthen a particular brand. For example, if a theme park were measuring engagement in real-time, areas of opportunity can be identified as the map shows high levels of interaction from the guests indicating their feeling that the brand is delivering less than the participants' expectation. The engagement may identify frustrating bottlenecks at various times throughout the theme park or a possible correlation of a temperature heat index and areas that require more fluids to be dispensed or water misters to be deployed to help cool the guests of the theme park.

Example 4

It is contemplated herein that the feedback input by the participants via the engagement system herein will typically be emotionally motivated or driven. For example, in one embodiment, employees of a particular factory will be able to provide instantaneous feedback in the event they do not approve the way a particular portion of the production line operates, for example, if the speed of the assembly line is increased by the factory foreman, line workers can indicate their disapproval by sending input via their mobile application. The anonymous, aggregated data will be instantly aggregated, encrypted and sent to management so that the foreman can lower the speed of the assembly line to a level acceptable by the assembly line workers. Anonymity is a key feature in this example as workers are less likely to share negative feedback if they believe they will be identified.

In another embodiment, students at a university on an exam may show their real time disapproval with respect to how a particular exam is being administered. The aggregated results can then be interpreted for relevance by the university. If the university receives a certain amount of data indicating a high level of disapproval, then the university will be on notice that something out of the ordinary is happening while the exam is being administered. This real-time information will allow the university to review and address the situation immediately.

Example 5

Market research organizations can use the system and method to gather relative information and behaviors about targeted groups and compare to historical performance and control groups.

DETAILED DESCRIPTION OF THE DRAWINGS

Figure 2:
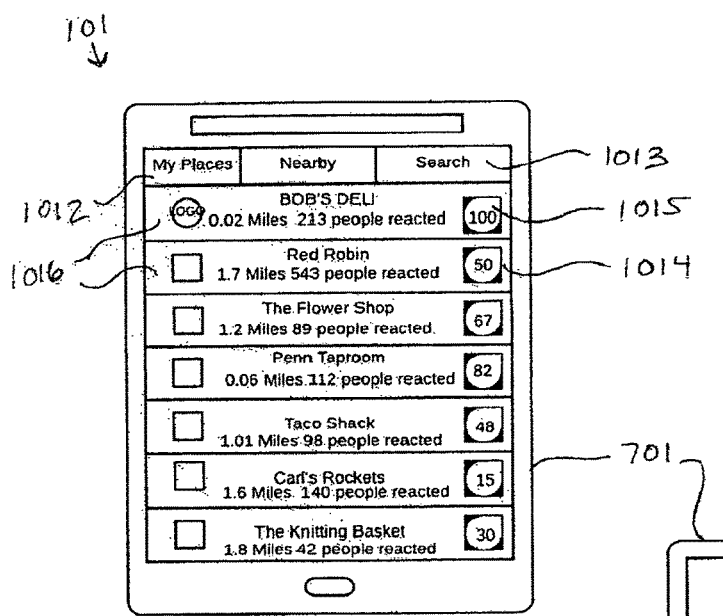
FIG. 2 is an example places screen of a mobile application according to a preferred embodiment.

A preferred embodiment is illustrated in the drawings. Referring now to FIG. 1, the participant engagement and feedback process 100 according to a preferred embodiment is shown. A participant opens the mobile software application 708 on her mobile device 701 when she is at or near a location about which she wishes to give feedback. The participant may open the mobile software application in response to an alert or push message she receives from a client, or in response to a physical sign or announcement at the location, or a participant may open the mobile application without provocation. Once open, the mobile software application 708, which is in communication with geolocation technology in the mobile device 701, pulls nearby place information from map application APIs or other APIs as is known in the art, and displays the nearby place information on the participant's device 701 in a Nearby Places list 101, an example of which is shown in FIG. 2.

Figure 3:
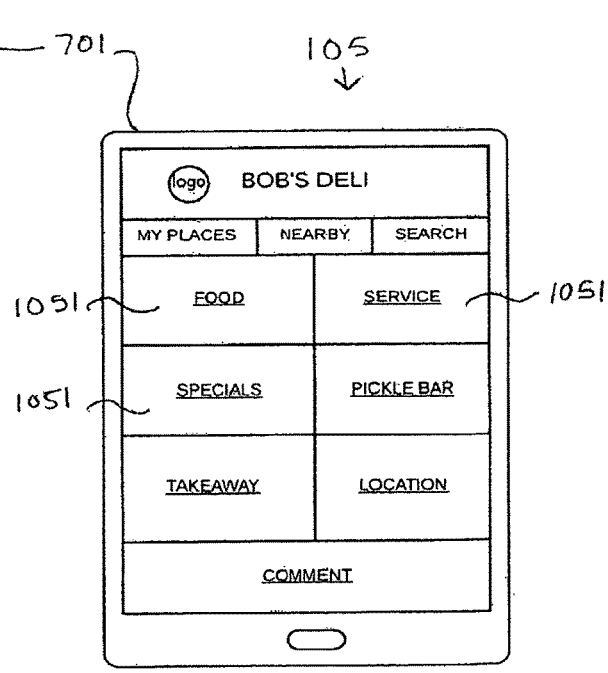
FIG. 3 is an example category screen of a mobile application according to a preferred embodiment such as might be displayed if the place Bob's Deli in FIG. 2 is selected.

The participant selects a place 102, either from the Nearby Places list 101 or from the participant's My Places list (not shown) which represents places preselected by the participant as well as places about which the participant has recently submitted engagement information. The selected place data input is transmitted to the data server 704 and compared against the list of clients in the client database 706. If the selected place is a client in the client database 706, then the data server returns to the participant mobile device 701 that client's most current Category List 105 for display, an example of which is shown in FIG. 3. If the selected place is not a client in the client database, then the data server returns to the participant mobile device 701 a Nonclient Category List 104 corresponding to the business type of the selected place. For example, if the selected place is a nonclient restaurant, a Nonclient Category list 104 for a restaurant is returned to the client mobile device 701 for display.

The participant selects a category 106 from the category list (105 or 104) and the input data corresponding to the selected category is transmitted to the data server 704 database from which the category was sent for the purpose of returning the Values List that corresponds to that category. For example, if the participant selects category "Food" from a client's Category List 105 originating from the client's category and values database 7062, the participant's selection input data triggers the client's category and values database 7062 to return to the participant's mobile device the client's most current Value List corresponding to the category Food. Values ideally are one-word descriptions of a feeling or emotional reaction, such as Fantastic, Very Good, Satisfied, Disappointed, Ecstatic, Frustrated, for example. Values also may be icons or emoticons corresponding to emotions or reactions. The object is to keep the values few (ideally not more than 6), simple and clear so the participant can quickly identify and select the choice that best matches the participant's true feelings in the moment. At a minimum, the values could be as simple as a thumbs up and a thumbs down, or a smile and a frown.

Figure 5:
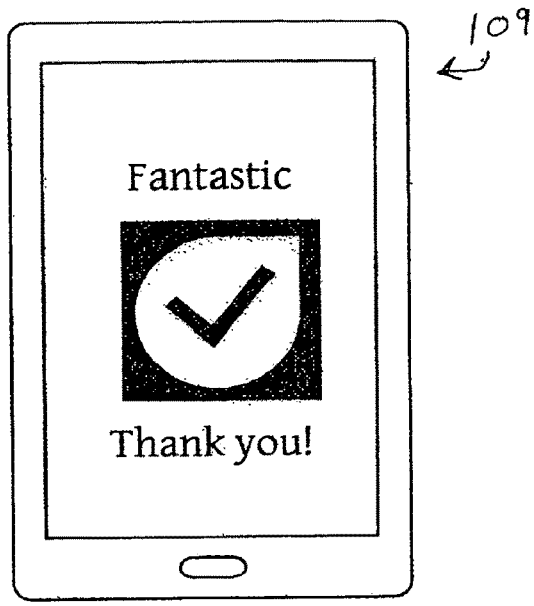
FIG. 5 is an example "submitted" screen of a mobile application according to a preferred embodiment such as might be displayed if the value Fantastic in FIG. 4 is selected.

The participant selects a value 108 from the Values List displayed 107. The participant's selection input data is transmitted to the data server 704 where, if it relates to a client the participant's selection input data is aggregated with other participant engagement data in the client data database corresponding to that client, and where, if it does not relate to a client, the participant's selection input data is aggregated with nonclient participant engagement data in the nonclient data database 707. When the data server receives the participant's selection input data, it returns to the participant's mobile device 708 a "submitted" message for display 109 which indicates participant's feedback has been submitted and which may also display the value selected. An example of a submitted message screen display 109 is shown in FIG. 5.

Referring now to FIG. 2, an example of a Nearby Places list 101 display screen is shown. Ideally, the places list screen displays a link 1012 to navigate to the participant's My Places list as well as a search function 1013 to locate a nearby place which is not shown in the list. Ideally, each place in the list (whether Nearby Places or My Places) displays the name of the place as well as other basic information pulled from the maps or other API as is known in the art, such as distance, logo, and/or type of place (restaurant, professional services, repair shop, salon, for example). Ideally, each place in the list 1016A through 1016E also displays a badge 1014 with an index number 1015 (for example, from 0-100) indicating the likelihood the participant will have a good experience engaging with the place.

The index number 1015 is calculated based on the participant's feedback and engagement data previously submitted, so that the more a participant uses the mobile application, the more data points are available for calculating the index number and the more accurate the suitability index is likely to be for that participant. In calculating the index number 1015 for a place, the participant's historical and recent input data about other places, including places of a similar type, is correlated and compared with the historical and recent selection data of all other participants who have submitted input data about the place; other characteristics of the participants may also be correlated and compared, such as participants who share certain demographics with the participant. Positive feedback and engagement data from participants who are alike the participant in terms of characteristics (whether demographic characteristics or engagement characteristics) indicates a greater likelihood of suitability and therefore results in a higher index score for that place for that participant.

Referring now to FIG. 3, an example engagement categories screen 105 displaying categories for a selected place is shown. In the example shown, the selected place is a client called Bob's Delicatessen displaying the client categories 1051 of Food, Service, Specials, Pickle Bar, Takeaway, Location and Comment, which categories are stored in the Client Database 706. If Bob's Delicatessen were not a client, the categories displayed would be the preset categories 7051A for "Restaurant" 7051 delivered from the Nonclient Categories and Values database 705.

It should be apparent from this example and this disclosure as a whole that each category has a list of values associated with that category, which values ideally represent different emotional reactions or feedback relating to that category. Thus, each category is associated with a value list, and collectively a category list with its associated set of values lists is referred to herein as a set of category/value lists. Clients may customize the categories and values in advance and also in real time using the interactive dashboard 709 displayed on the client device 702 (a computer, tablet, mobile device or other internet-connected electronic device equipped with software according to the invention as well as internet connectivity, a display screen and a graphical user interface with input selection and two-way communication capability, as is known in the art). Client categories and values are stored as sets of category/value lists in the Client Categories and Values database 7062 in the client database 706 in the data server 704 so they may be pushed to a participant's mobile device 701 when a client place is selected 105.

Similarly, preset categories and values for nonclient places are stored as sets of category/value lists in a Nonclient Categories and Values database 705 in the data server 704 so they may be pushed to a participant's mobile device 701 when a nonclient place is selected 104. The nonclient Category List 104 displayed ideally depends on the type of business selected; the nonclient Categories and Values database 705 may include preset categories and value lists for multiple different kinds of businesses, such as Restaurant 7051, Repair Shop, Hotel, Salon, Professional Services, for example. Preset categories for Restaurant 7051A ideally include categories about which participants are likely to wish to give feedback, such as, for example, Food, Service, Atmosphere, Location, Overall Experience. A category for Comment may be included as well to collect participant comments and even images in case a participant wishes to submit a specific message or a photo taken with their mobile device 701.

Preset values associated with each category ideally are values likely to correspond to emotional reaction about that category in that type of business—for example, preset values for the category Food in business type Restaurant may include Fantastic, Very Good, OK and Disappointed; preset values in the category Service in business type Restaurant may include Fantastic, Satisfactory, Slow, Inattentive, Terrible. Availability of preset, nonclient categories and values for different kinds of businesses is an important feature of the preferred embodiment because it allows participants to use the mobile device whenever they are engaging in an event at a place whether or not the place is a client. Regular use by multiple participants over time contributes to accuracy of the suitability index number for participants and also collects valuable participant engagement data about nonclient places, which participant engagement data may be aggregated, correlated, analyzed, interpreted, stored and used in various ways, including use by a sales team to sign up new client places, as well as use by third parties who may wish to purchase datasets for their own purposes. Participant data stored in data server 704 ideally is anonymous due to use of encryption software and does not contain personally identifying information about any participants, but rather ideally includes only participant characteristics information including, perhaps, both demographic characteristics and engagement (behavioral) characteristics.

Figure 4:
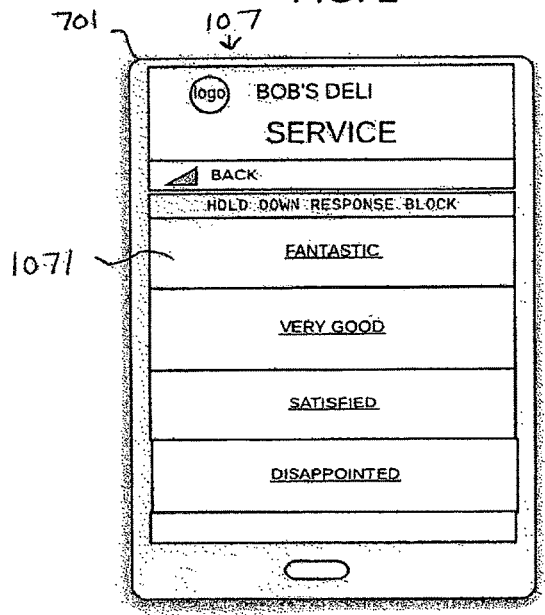
FIG. 4 is an example values screen of a mobile application according to a preferred embodiment such as might be displayed if the category Service in FIG. 3 is selected.

Referring now to FIG. 4, an example screen displaying a Values List 107 for the selected value Food is shown. In this example, if a participant viewing the category list 105 shown in FIG. 3 selected category Food 1051A, the screen shown in FIG. 4 would be displayed on the participant's mobile device 701. The participant then could select one of the four values shown 108 by, for example, holding their finger down on the selected value until the selected value block 1071 changes color. The selected input data corresponding to the participant's selection Fantastic then is transmitted to the Client Participant Data database 7064 in the data server (because, in the example, Bob's Delicatessen is a client), where it (the engagement selection input data) is stored along with other targeted characteristic data such as geolocation, timestamp and participant ID code. Once it is submitted, in real time, the participant engagement data is aggregated in the Data Server 704 with other participant data for that client in the Client Participant Engagement database 7064 which is in real-time communication with the Client Dashboard 709 displayed on the client device 702. Submission of engagement data by a participant to the Client Participant Engagement database 7064 for a client may trigger an alert on the Client Dashboard 709 for that client so the client knows new data has been received and is available for interpretation, analysis and response. At the same time as the participant's selection input data 108 is transmitted to the data server, the application server may return to the participant's mobile device 701 a colorful "submitted" screen display 109, an example of which is shown in FIG. 5, to reward the participant for submitting feedback and let the participant know the feedback has been received. After submitting feedback, the application server may return to the participant's mobile device a screen prompting additional opportunities for engagement 110.

Data Display and Analysis, "Listen" and "Speak"

When one or more participants have submitted engagement data about a client and the engagement data is received in the Client Participant Engagement Database 7064, the data server transmits to the Client Dashboard 709 in real time an updated interactive report which includes the engagement data just submitted. The interactive report may comprise data aggregated and displayed via the interactive Client Dashboard 709 in a variety of ways in different views, graphs, lists and charts with interactive capabilities, including filters, links and graphing choices, enabling the client to explore, zero in, drill down, analyze, interpret, view, compare and contrast the data across a wide variety of criteria; the functionality and features enabling the interactive and flexible display of data are sometimes referred to herein as the "listen" capabilities, to differentiate them from the "speak" capabilities next described.

As used herein, the "speak" capabilities refers to the functionality and features enabling the client to respond to one or more selected cohorts of participants in real time, which response may include a real-world response (such as effecting a physical action to take place, for example, sending a client employee to each participant in the selected cohort(s) to deliver a complementary dessert, or sending a client worker to clean up a mess); or a digital response such as sending each participant in the selected cohort(s) a push message or alert to the participant's mobile device 701 with, for example, an apology, a special offer, a coupon or discount, or a request for additional engagement data or feedback (to refine the client's understanding of the initial engagement data received from participants in the cohort, for example). It should be understood from this disclosure that the "listen" capabilities refer broadly to engagement data flowing from participants to client in real time and client's ability to listen to and understand participants in real time via said engagement data, and that the "speak" capabilities refer broadly to communications, actions and data flowing from client to participants and client's ability to speak to (communicate with) participants in real time to better understand, engage with and respond to selected cohorts of participants in real time.

When one or more participants have submitted engagement data about a nonclient and the engagement data is received in the Nonclient Participant Engagement Database, the data is stored for use in connection with calculating suitability indices as described herein and for other general purposes or comparative data analysis; and so that if a Nonclient becomes a Client by signing up, installing and/or logging into the software application and creating a client account, the participant engagement relating to said new client, data which has been stored in the nonclient participant engagement database, is migrated or linked to the new client account and client database so that said new client already has participant engagement data to review, explore, analyze and use via the interactive client dashboard. Other uses of participant engagement data stored in the nonclient participant engagement database should be apparent as is known in the art, including selling access to anonymous, aggregated engagement data to others for market research analysis or other commercial or noncommercial purposes.

Figure 6:
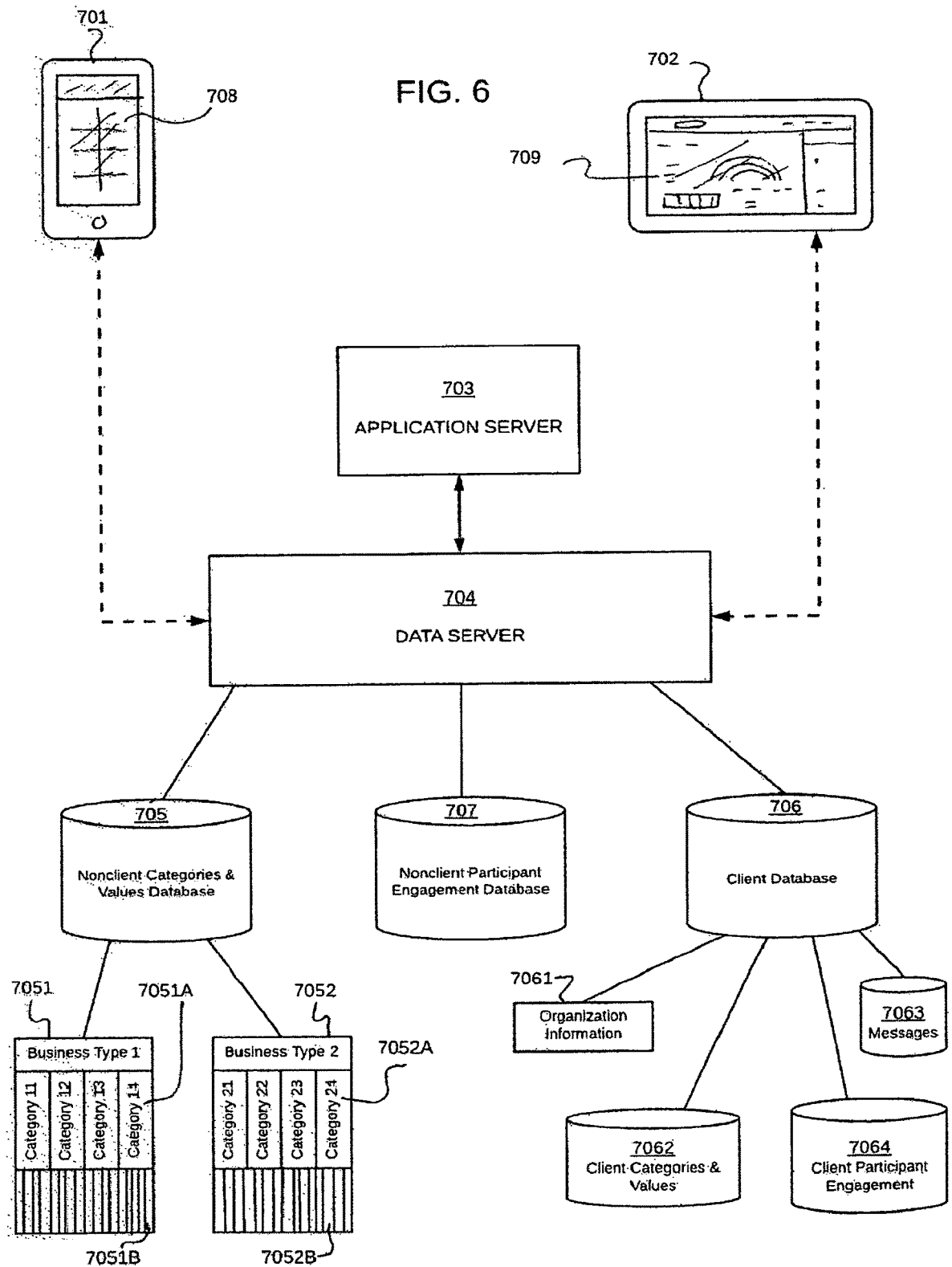
FIG. 6 is a diagram of a system of the method according to a preferred embodiment, with communication shown in dashed lines.

Referring now to FIG. 6, the components of a system according to some embodiments of the invention are shown. An application server 703 stores the software application and any other information desirable to keep separate from non-application data. The application server is in communication with a data server 704 which includes a nonclient categories and values database 705, a client database 706 and a nonclient participant data database 707. Alternatively, the application server 703 and data server 704 could be unitary. The data server 704 is in two-way communication with the participant device 701 and the client device 702. Alternatively, the application server 703 and the data server 704, and each of them, are in two-way communication with the participant device 701 and the client device 702.

Figure 7:
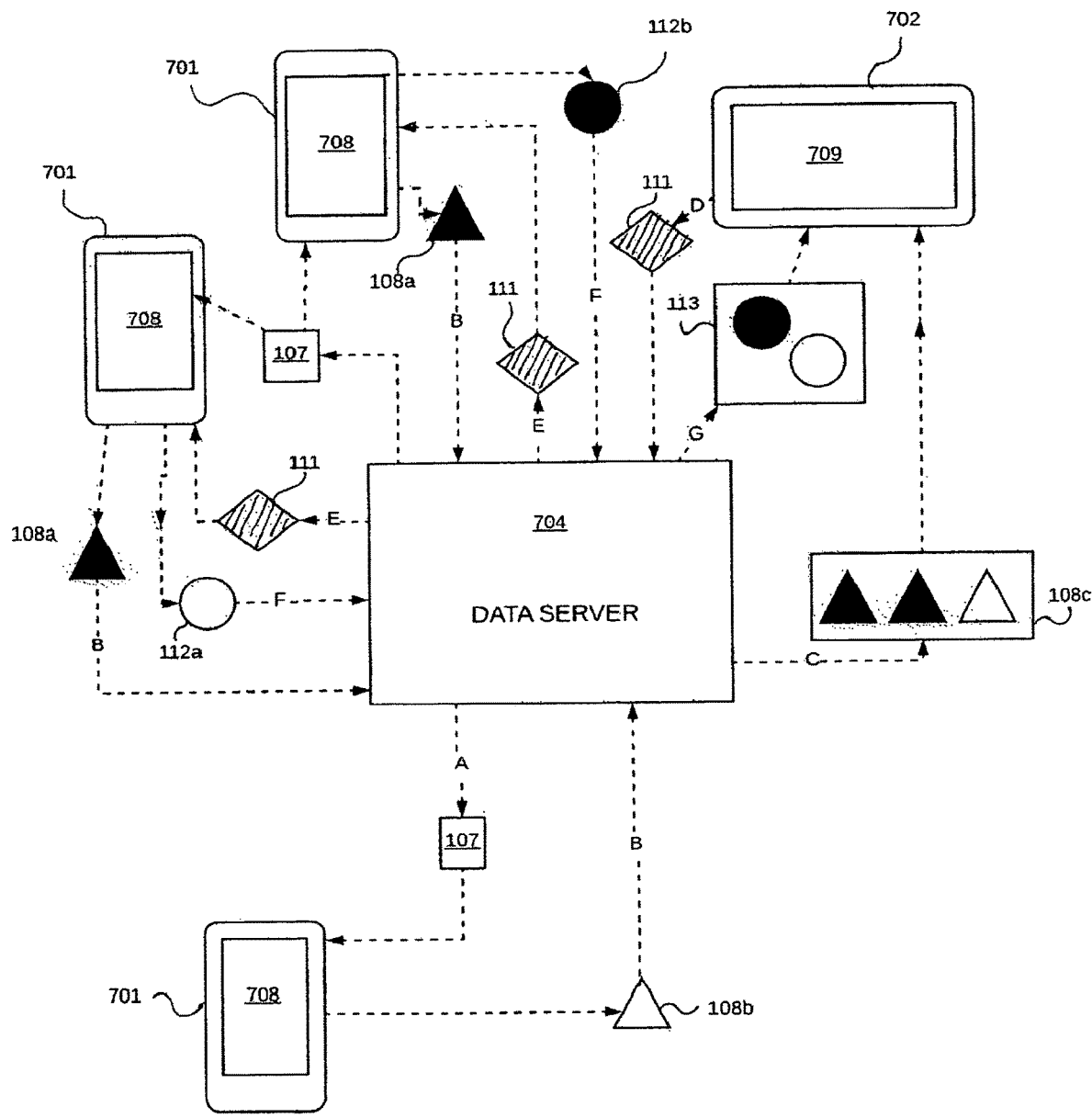
FIG. 7 is a diagram of information flow of a system of the method according to a preferred embodiment in use, with information flow shown in dashed lines with arrows to show direction and letters indicating the order of process steps from A through G.

As previously described and partially illustrated in FIG. 7, when a participant is using the mobile software application 708 on her participant device 701, the participant's selections are transmitted to the data server and trigger a responsive communication from the data server to the participant device 701 via the mobile software application 708, which responsive communication depends on the participant's selection. For example, when the participant selects a place corresponding to a client in the client database, the application server 703 or data server 704 delivers to the participant the most current categories list 105 for that client in the client database 706 stored in the data server 704; and when the participant then selects a category from the client categories list, the selection input is transmitted to the data server, which transmits to the participant's device the most current values list 107 corresponding to that selected client category stored in the client categories and values database 7062 for that client (step A shown in FIG. 7). When the participant selects a value 108a/108b from the values list, the participant's selection input 108a/108b is transmitted to the data server 704 (step B shown in FIG. 7), which stores the participant's selection input along with participant characteristics information including participant ID (encrypted or User ID), geolocation and time stamp information. The participant's selection information bundled with participant characteristics information is herein referred to as "participant engagement data" and, alternatively, as "feedback data."

Participant engagement data received in the data server is aggregated in real time with selection input data of other participants received in the data server at the same time (or nearly the same time, for example, in the few seconds to minutes since the last aggregated data was sent to the client dashboard) relating to that place/client, that category, that value, and/or other criteria as may be desirable. Aggregated participant engagement data 108c is transmitted to the client dashboard 709 in real time (step C in FIG. 7), updating data displayed. In response to aggregated participant engagement data 108c being received, a client may create a custom message (or alternatively may have already created a custom message to be sent that is triggered by the particular aggregated participant engagement data being received) to be sent to a selected cohort of participants, for example the cohort of participants selecting and submitting a particular value in a particular category (as illustrated, the cohort selected is the cohort of participants selecting value 108a). Said client message ill is transmitted to the data server 704 (step D in FIG. 7) which causes the message 111 to be transmitted to all participants who belong to the selected cohort (step E in FIG. 7). If the message 111 requests a response from participants, such as for example a request for refined feedback including a set of refined category/value lists, participants respond, for example by selecting the category and value best matching their feedback, and the participant response 112 is transmitted to the data server 704 (step F in FIG. 7), aggregated and stored. Aggregated participant response data 113 is simultaneously transmitted to the interactive client dashboard 709 (step G in FIG. 7) where it may be viewed, analyzed, measured for message performance statistics and otherwise processed as desired by the client (such as causing a free gift to be sent to the responding participants, or other digital or real-world processing and follow up action as may be desired).

When new participant engagement data is transmitted to the data server, aggregated and stored, the data server may deliver to the client device an alert that new data has been received (which alert will be apparent on the client device, visually or audibly, unless the client device has selected that alerts be turned off), and also delivers to the client device, via the client interactive dashboard, an updated or new interactive report incorporating the new data received. Depending on the filters and display parameters selected by the client, the interactive report displayed may be only new data received in the last 30 seconds, 1 minute, 5 minutes, 1 hour, 24 hours, or any period of time selected by the client, enabling the client to analyze and view the data in different ways over different periods—for example, a client may wish to compare the current 24 hours with the same time last week; or a client may wish to see only engagement data from the past 30 minutes or 15 minutes or less to identify whether something is broken and needs immediate response. If a client determine that continuous, real-time updating and delivery of new aggregated participant engagement data is slowing down or "hanging" the interactive client dashboard too much, the client may choose to have the new aggregated data temporarily stored in a buffer area of the application software on the client device where it will be batched and displayed upon the refreshing of the page or at some interval chosen by the client. The purpose of using a buffer to temporarily store new data updates is to avoid the client dashboard being unusable if it is continuously receiving new updates; other technology as known in the art may be used to collect continuously updated information for display without interfering with the functioning of the client interactive dashboard. It is an object of the invention to display real time engagement without delay, so it is anticipated that the buffering or other technology would not delay the updating of the dashboard more than a handful of seconds to a minute.

It is another object of the invention that the client dashboard provide interactive functions to enable clients to explore, analyze and view historical and real time data in multiple ways in real time; and to respond to real time engagement data by initiating real-world or digital responses (herein called the "speak process" or "speak capabilities" when referring to digital responses) such as, for example, sending a worker to a participant's location to address an issue reported by a participant via the mobile software application; or creating and sending, in real time, a responsive categories list and values list to the participant via the mobile software application to refine the client's understanding of the participant's engagement data received; or creating and sending, in real time, an offer or coupon to the participant, ideally relating to or tailored to the participant engagement data to which it is responding. It should be apparent that real-time digital response may include automated messages created in advance and stored in the client messages database which are triggered to be sent automatically according to the triggers selected when the message was created.

In a preferred embodiment, a client dashboard is in constant or near-constant communication with the data server and consists of some combination of an overview page (FIGS. 8 and 9), a drilldown page (FIG. 10), a speak message overview page (FIG. 11), a speak message create page (FIG. 12) a geodata page, a comments page, an images page and a unique users page (FIG. 13); additional pages may be included to enable clients multiple different ways to view and analyze engagement data in real time. In a preferred embodiment, a banner (FIG. 8, 200) or other area appearing prominently on every page of the client dashboard displays the client ID 201, a Listen navigation button 202, a Speak navigation button 203 as well as standard navigation buttons 204 such as My Account, App Settings and Logout/Login. As used herein, "Listen" refers to the group of functions accessible via the interactive client dashboard whereby a client can view, analyze, drill down and explore engagement data received from participants in the data server; and "Speak" refers to the group of functions accessible via the interactive client dashboard whereby a client can communicate to participants, or selected cohorts of participants, by creating and sending customized messages to participants via the mobile application, which messages may include customized categories and values created and sent in real time in response to participant feedback, and/or which messages may include customized offers or other messages created and sent to participants in real time via the mobile software application. Message performance is measured and displayed on the interactive client dashboard as described in connection with FIG. 11, measuring such statistics as Reach, Open Rate, Dismissals or other message performance statistics as known in the art. The Listen navigation button 202 allows the client to access pages where the client can use the Listen capabilities, and the Speak navigation button 203 allows the client to access pages where the client can use the Speak capabilities.

In a preferred embodiment, a filter section 205 is displayed on the client dashboard enabling the client to zero in on the desired engagement data, filtering by criteria including, for example, Timeframe criteria such as Year to Date, 30 Days, 7 Days, 24 Hours, and New; Category criteria such as, for example, All Categories, Food, Service, Specials, Pickle Bar, Takeaway, Location and Comment. It should be apparent that other criteria and groups of criteria may be used as filters to enable clients to quickly see, analyze and understand the participant engagement data desired. In a preferred embodiment, the selected filters are displayed prominently and are printed on any reports saved or printed from the dashboard, to ensure the client can clearly see what data is included and what data is excluded.

Figure 8:
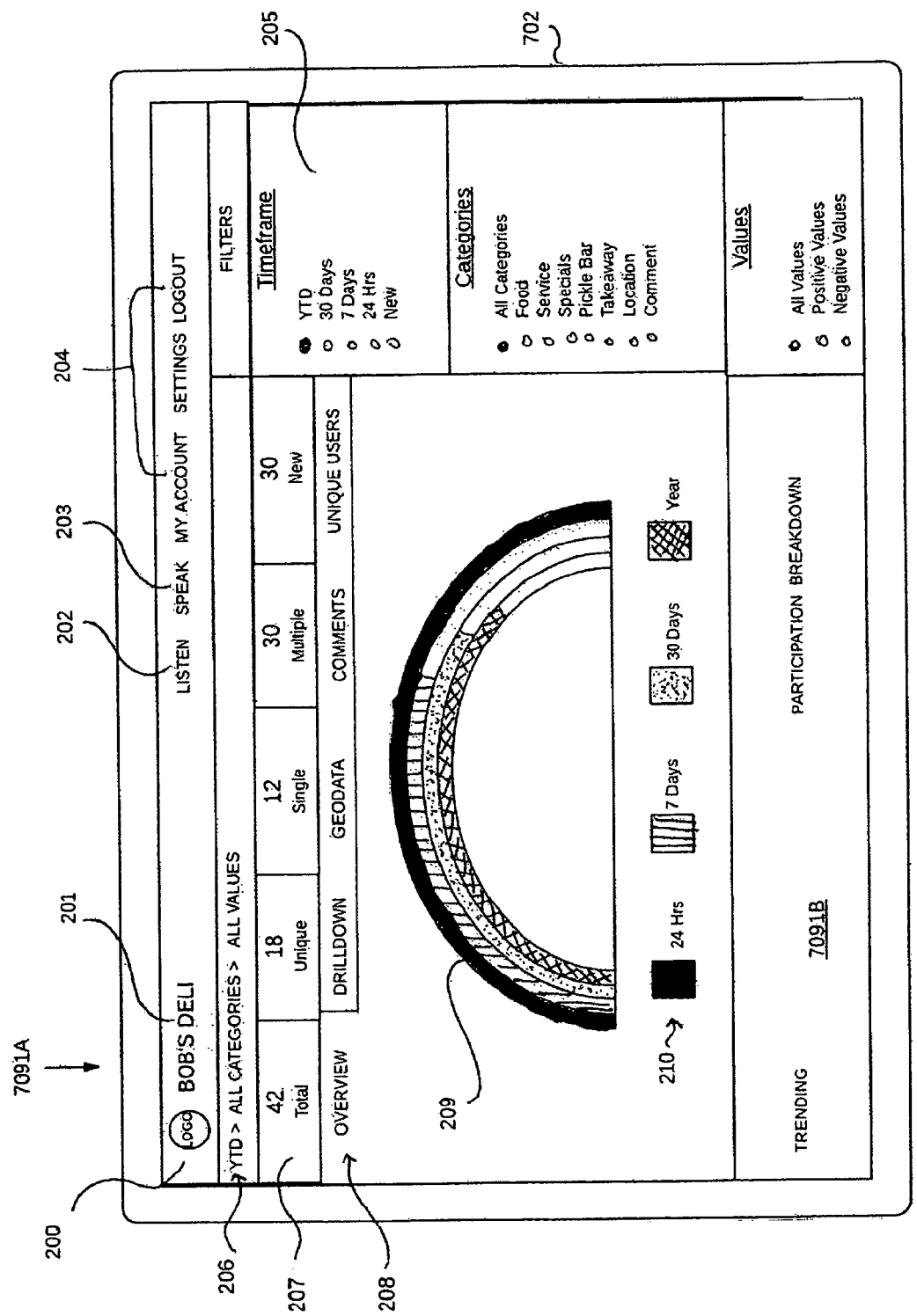
FIG. 8 is an example top portion of an overview page of an interactive client dashboard according to a preferred embodiment.

In a preferred embodiment, each client dashboard page is "mobile friendly" as known in the art, and each page may include a top section, a middle section and a bottom section, each section coming into view, depending on the size of the client device screen and the client device view settings, by scrolling the page up and down on the client device 702. In a preferred embodiment, the top section of an overview page of the client dashboard, an example of which top section is shown in FIG. 8, includes box scores 207 indicating numbers of engagements about the client that day (counters reset to 0 at 12:00 a.m. every night), broken into separate analysis groups of Total engagements, number of unique user engagements (where each "unique user" submitting engagement information is counted exactly once), number of single engagements (meaning the participant submitted engagement information about only one category), number of multiple engagements (meaning the participant submitted engagement information about multiple categories), and number of new participants (where a new participant is defined as a participants submitting feedback about the client for the first time). Alternatively, a box score may display engagements received in the past 1 hour, or engagements received since the last time the page was refreshed, or some other limitation to a certain percentage of the newest engagements.

In the example embodiment of a top portion of an overview page of an interactive client dashboard shown in FIG. 8, an arc graph 209 displays arcing bars preferably of different colors, each representing engagement data received by the data server for that client over different time periods, as shown in the graph legend 210; in the example top portion of an Overview screen shown in FIG. 8, the time periods depicted are the previous 24 hours (a rolling 24-hour period), 7 days (a rolling 7-day period), 30 days (a rolling 30-day period) and a Year (a rolling 365 day period). In the example embodiment illustrated in FIG. 8, each arc represents the relative number of engagements over each time period, with the length of the arc representing the relative number of engagements (a longer arc indicating a greater number of engagements). Contrasting colors in each arc may be used to depict the different time frames illustrated, for comparison and context, with the graph legend 210 indicating which color corresponds to which time frame. Viewing overall engagement data over different time periods as shown in FIG. 8 may help a client quickly identify an unusually high number of engagements over the rolling 24 hour period, which may indicate a need to delve into the 24-hour data to identify the cause for the increase in engagements. It should be apparent that the interactive dashboard and real-time engagement capabilities disclosed herein provide the client a meaningful mechanism to quickly recognize, identify, refine and respond to crises or participant issues in real time, while the client has an opportunity to remedy the situation, if needed, or gather additional information about the issue. It also should be apparent that having box scores showing numbers of engagements since midnight provides a useful context and comparison to having an arc graph showing engagement numbers over a rolling 24 hour period as well as longer time frames. Without context, a client might not readily notice that engagement numbers are way up or way down, and so a client might not appreciate the need to drill down into the newer data to understand what is happening in the moment. Thus, it should be apparent that without features, tools, graphs and filters to provide context, a client might miss the opportunity to respond to a crisis in real time.

Alternatively, an arc graph such as shown 209 may be used with two contrasting colors per arc to show relative proportion of positive values to negative values received during the period depicted, or may be assigned other purposes as desired by the client.

Figure 9:
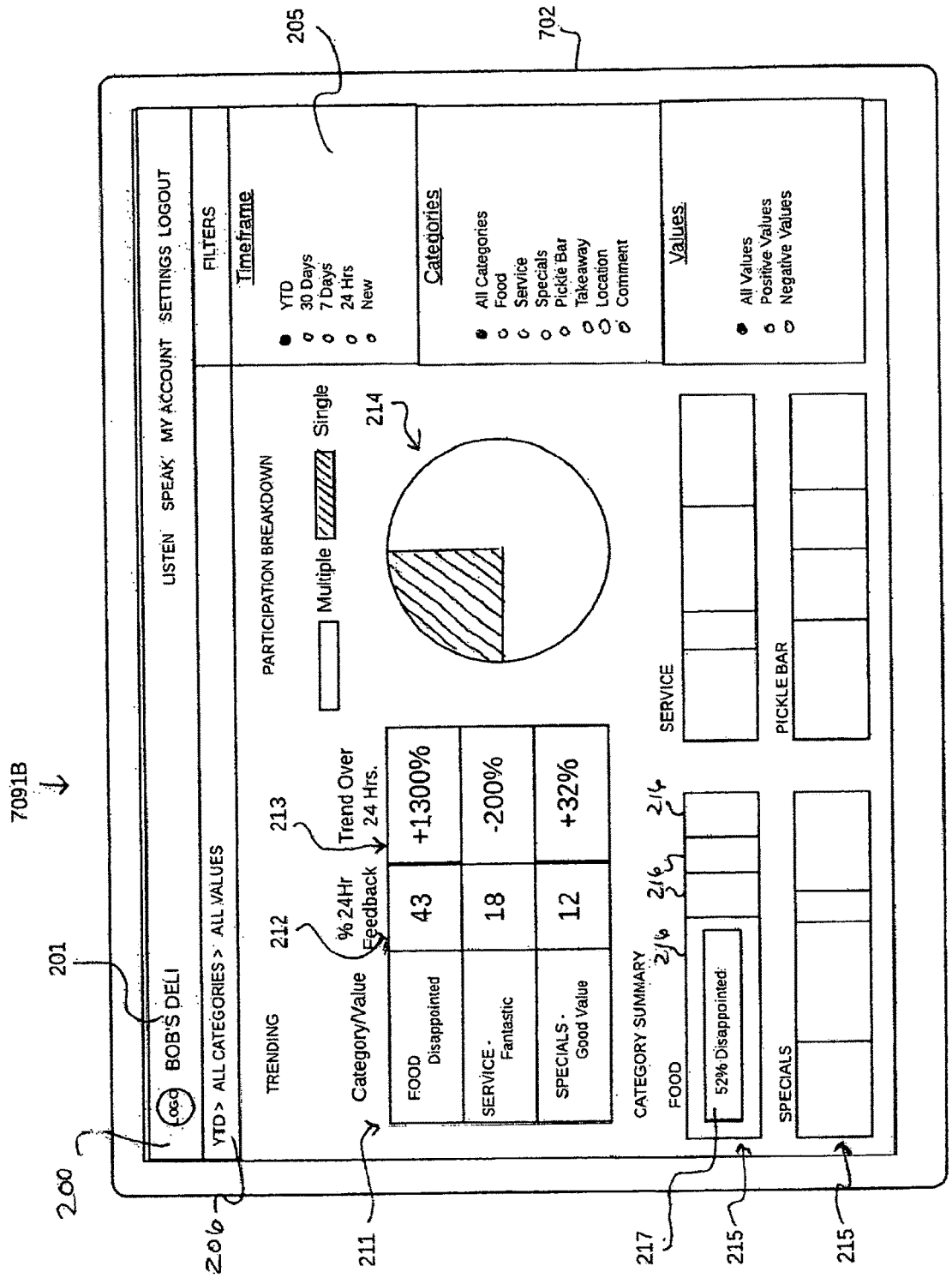
FIG. 9 is an example middle portion of an overview page of an interactive client dashboard according to a preferred embodiment.

Referring now to FIG. 9, an example middle portion of an Overview screen according to a preferred embodiment is shown. The top three trending Categories and Values 211 are shown along with percentage of 24 Hr. Feedback 212 and Trend (percentage increase or decrease) over 24 hours 213. Engagement data sent to the data server is aggregated by cause and value and time stamped, and aggregated data is displayed on the client dashboard updated continuously, or near continuously, in real time as engagement data is received, aggregated and stored in the data server, as previously described. The three values (and the categories to which they belong) with the greatest number of selection inputs received over a rolling 24 hour period are displayed 211 in the Trending section of the example middle portion shown in FIG. 9, along with the percentage of total feedback over that rolling 24-hour period each top trending value represents 212 and the percentage change calculated 213 for each top trending value over the same rolling 24-hour period. Use of the trending screen allows a Client to identify the most timely and, quite likely, the most important interactions between participants and the client so the client may quickly see and respond to the participants who selected those values, or all participants, or some combination of participants or even non-participant customers, in response to the trending issues displayed.

In the example middle portion of an overview page shown in FIG. 9, a Participation Breakdown also is shown in the form of a pie chart 214. The Participant Breakdown pie chart displays the number of multiple engagements vs. single engagements relating to the rolling 24-hour period so the client may identify to what degree the trending values and data originate from single-engagements (one engagement input per participant about the client) or multiple engagements (engagement inputs from participants submitting multiple inputs about the client). Single engagement data can be understood to indicate breadth of feedback, for example, in that the data comes from multiple participants who each submitted only one point of feedback. In contrast, multiple engagement data can be understood to indicate depth of feedback, for example, in that repeated or multiple points of feedback from the same participants is likely to indicate strong emotion or at least a high level of interest and engagement on the part of those participants with respect to the client. The example shown in FIG. 9 also shows aggregated category and value data received in the same rolling 24-hour period displayed as block diagrams 215, with each category displayed in its own block diagram 215 and each value for each category displayed in a different color block 216 within the block diagram, sized proportionally according to the number of selection inputs received by participants for that value in that category over the rolling 24-hour period. Placing the selection pointer or mouse (currently known as "mousing over") a value block in a block diagram may cause an information bubble display 217 to appear providing summary information about that value and the percentage represented, as shown in FIG. 9.

Figure 10:
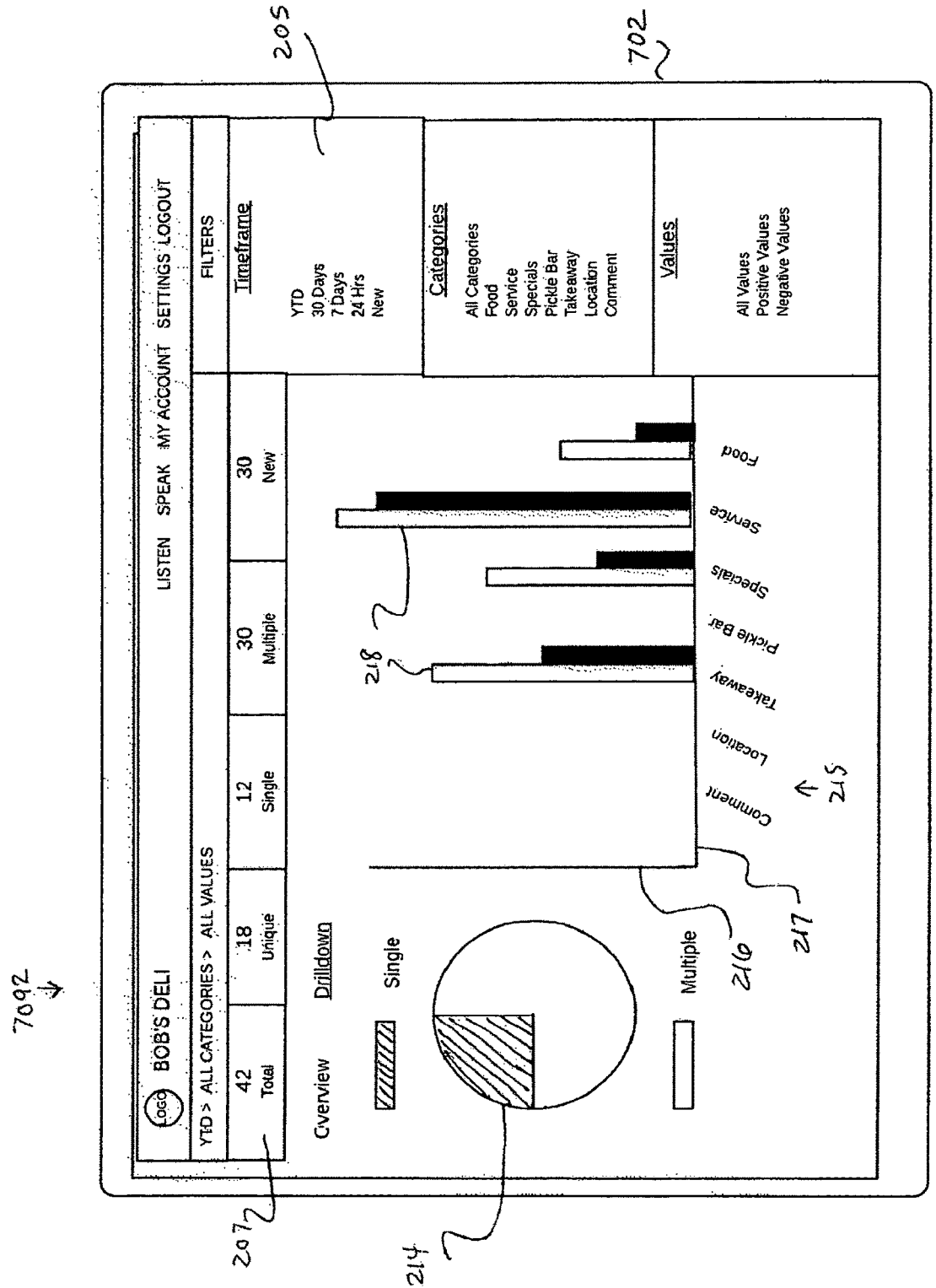
FIG. 10 is an example Drilldown page of an interactive client dashboard according to a preferred embodiment.

Referring now to FIG. 10, an example of a top portion of a drilldown page 7092 according to a preferred embodiment is shown. Color-coded blocks 207 display a box score as previously described in FIG. 8. A participant breakdown pie chart 214 displays single user engagement data vs. multiple user engagement data as previously described in FIG. 9, according to the filters selected 205. A bar graph 215 with a y-axis 216 representing number of engagements in the past 24 hours (or other timeframe as selected by the filters 205) and an x-axis 217 representing categories, as shown in FIG. 10, or alternatively categories and values, (as selected by the filters 205) has bars 218 of different lengths and colors each bar representing, for each category, total number of engagement inputs received for a particular value in that particular category in the past 24 hours (or other timeframe according to the filters selected). Filters 205 may be applied by client to limit or expand data displayed. Display of scores, statistics and data on the drilldown page 7092 is fully customizable by filters 205 enabling the client to quickly and efficiently explore and analyze data received in real time, enabling quick switching from broader contextual graphs to see general trends to hyper focused graphs to see detail about a particular category or value over the past 2 hours, for example, or comparing value data received in a particular category over different time frames.

Figure 11:
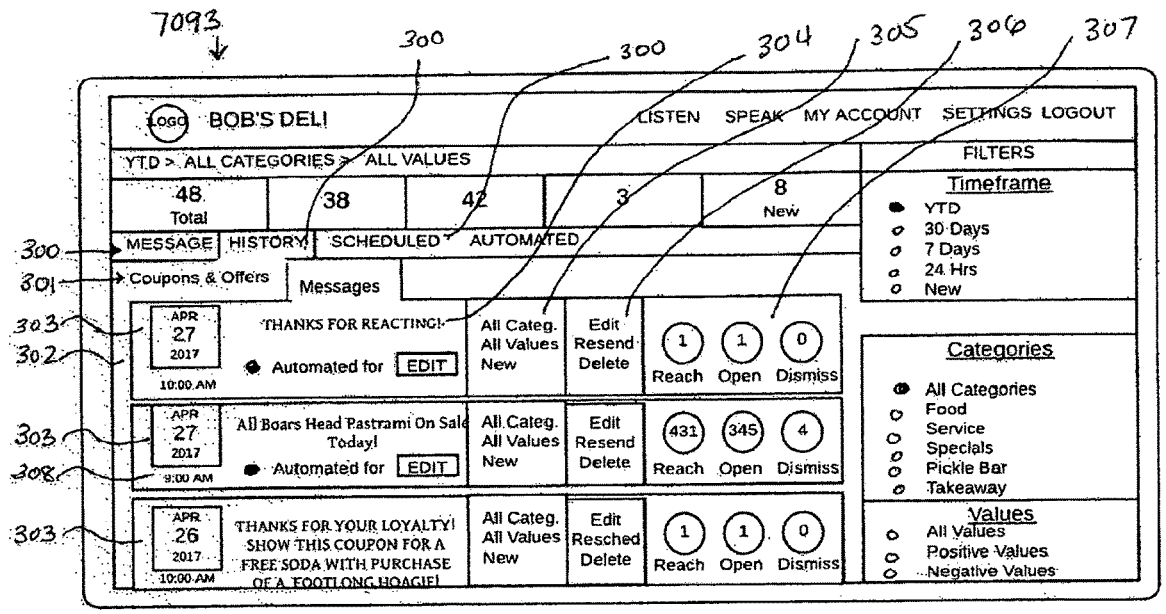
FIG. 11 is an example messages history page of an interactive client dashboard according to a preferred embodiment.

It should be apparent that the various graphs, calculations and displays, shown in FIGS. 9, 10 and 11 for a rolling 24 hour period, may be calculated for different time periods and/or using different combinations of categories, values or characteristics, all of which may be customized easily by the client in real time using selection filters and other methods as known in the art.

Messaging (Speak) Process

It is another object of the invention that the client may use the interactive client dashboard 709 to communicate with participants in real time in response to participants' engagement data received. Alternatively, a client may use the interactive client dashboard 709 to initiate engagement with participants, for example, by sending a message containing a special offer, a coupon, or an invitation to submit feedback. As described herein, it is an object of the invention that the client be able, in real time, to select a cohort or cohorts of participants to receive a particular message. It should be apparent that although the real-time functionality is a key object of the invention, a client also may use the speak capabilities to create messages in advance and store said messages so they are ready to be sent to selected cohort(s) at a future date, and that said messages may be scheduled to be sent automatically by the data server to participants at a particular time or upon the occurrence of a trigger event such as receipt of particular engagement value data from participant(s). As described herein, a client message may be an apology, public service announcement or other message not requesting a response; or a client message may be a set of category/value lists to collect refined feedback about a particular issue or event; or a client message may be an offer, coupon, discount, or other message designed to create a commercial response by participant.

Figure 12:
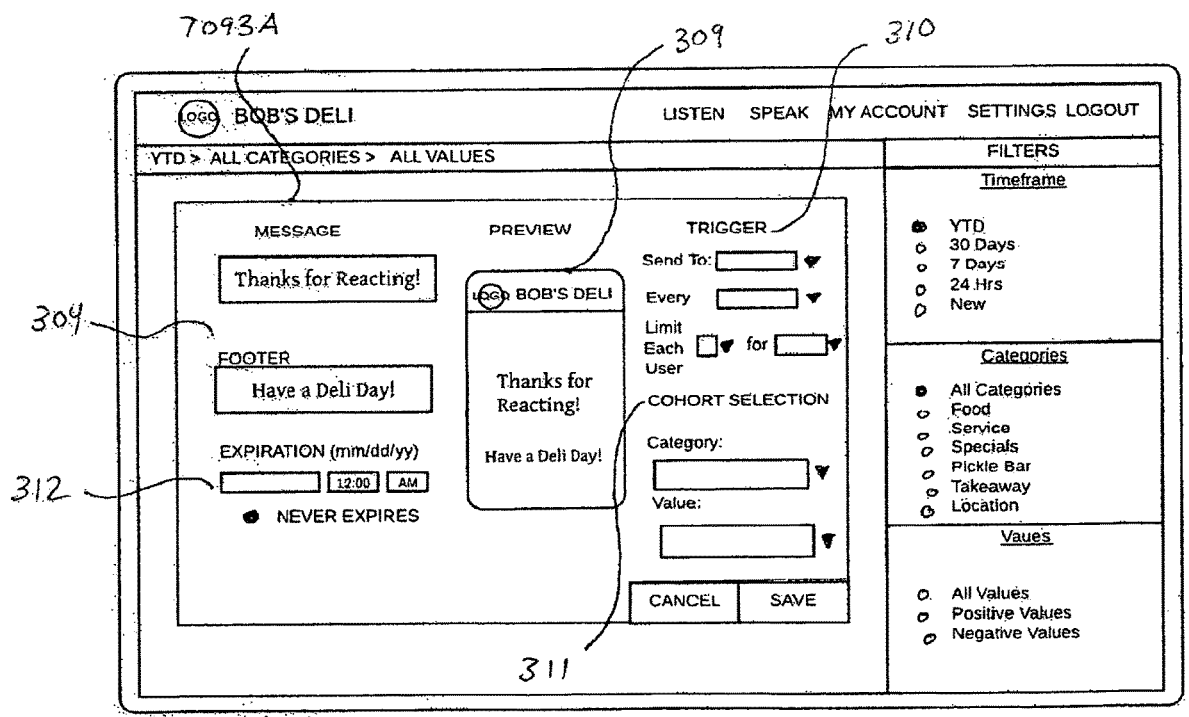
FIG. 12 is an example create message menu of an interactive client dashboard according to a preferred embodiment.

Referring now to FIG. 11, an example "speak" messages history page 7093 according to a preferred embodiment is shown. Menu navigation links, shown here as tabs 300 (Messages, History, Scheduled, and Automated) with the tab "History" selected, bringing up a submenu display here shown with subtabs 301 "Coupons & Offers" and "Messages" with Messages selected. An interactive summary list 302 of historical messages, from most recent to least recent, is displayed. Each summary list entry 303 displays the date and time the message was sent 308, the text of the message sent and type of message 304, the selected filters applied to govern the sending of the message 305, a command menu 306 enabling the client to edit, resend or delete the message, and an analysis report 307 indicating the number of participants reached by the message (Reach), the number of participants who opened the message (Open) and the number of participants who dismissed the message without opening (Dismiss). It should be apparent that the command menu 306 may be used by a client to customize or re-send a previously created message with ease and speed, in real time, as needed. A client may easily and quickly create a new message by navigating to the "Message" tab 300 on the Speak page 7093, which brings up a "Create Message" menu 7093A. FIG. 12 shows an example "create message" menu according to a preferred embodiment. The "edit message" menu, which may be reached from the command menu 305 on the message history summary list 302 may be substantially similar to the "create message" menu shown in FIG. 12. An example messages menu accessible at the Message tab 300 on the Speak page 7093 may have radio buttons or tabs or other selection feature enabling a client creating a new message to select the type of new message; selection options may include Automated, Coupon/Offer, Feedback Request, or other message types as may be desired. Selection of message type may cause the resulting "create message" menu to include or exclude options, filters or features to ensure the menu is tailored to the type of message being created. For example, if "Coupon/Offer" is selected, the resulting "create message" menu may include features to include a barcode corresponding to the coupon or offer, which barcode may be incorporated into the message so it can be scanned at a client establishment to apply the coupon or offer to a participant's purchase. If "Automated Message" is selected, the resulting create message menu may include features to designate the rules governing sending of the message. The example create message menu shown in FIG. 12 shows an example menu for creating an Automated Message as if the type "Automated Message" was selected by the client creating the new message.

Referring now to FIG. 12, an example create message menu for an automated message is shown. A message content section 304 contains text boxes and may also include a menu to upload images for the message and message footer. The message header ideally is pre-set as a banner containing the client's name and logo, as shown in the message preview 309, which shows how the message being created will appear on a participant's mobile device 701 via the mobile application 708. A Trigger section 310 includes dropdown menus or other selection mechanisms, as are known in the art, to govern the triggering of the automated message being sent to participants, including for example: which users will automatically receive the message (all participants or subsets of participants based on criteria the client may wish to create); the frequency with which the message is sent (for example, "every 6 (selectable) unique reactions (selectable)") if a client wishes the automated message not be sent every time a participant submits engagement data; a limit to the number of times the automated message is sent to each unique participant over a selectable time period (to avoid, for example, a coupon being sent to the same participant multiple times a day); and cohort selection features 311 which enable a client to have the message automatically sent only to participants who submit a particular value selection to a particular category. An Expiration section 312 enables a client to choose a date and time after which the automated message will stop being sent or to select "Never Expires" for automated messages the client wishes to be sent on an ongoing basis, subject to the Trigger controls 310 and 311 enabled. Once a client has completed the creation of the message, it may save the message in the client messages 7063 portion of the client database 706 by selecting the "save" button, or it may cancel creation of the message using the "cancel" button, as known in the art. It should be apparent that use of the "create message" or similar "edit message" menu functionality enables a client to very quickly and easily create custom messages with a great deal of control over who receives them, as well as how and when they receive them, and that the ability to automate and schedule messages so created provides the client with powerful tools to promote a high degree of participant engagement quickly and efficiently.

It should be apparent that a similar "create message" menu may be used to quickly and efficiently create, in real time, a "Request Feedback" type message to be sent to a selected cohort of participants in response to participant engagement data received in real time, designed to help a client refine and better understand the participant engagement data received. For example, a client noticing a high number of participants submitting the value "Dissatisfied" for the category "Food" may in real time create and send to that cohort of participants a "Request Feedback" message consisting of a refined set of category/values lists to determine the cause of the participants' dissatisfaction; the message might say "What is bad about the food?" with a category list that may include Quality, Temperature, Portion Size, Wrong Order. Values for Quality may include Bad Texture, Bad Flavor, Dirty/Tainted, Too Salty, Bland, Greasy. Values for Temperature may include Too Hot and Too Cold. In this way, a client may quickly pinpoint a problem in the kitchen and be able to address it immediately, while simultaneously protecting its relationship with dissatisfied participants who are likely to feel valued as a result of the immediate response to their complaint from corporate headquarters directly to them (eliminating the need to complain to servers, who may or may not be responsive). Moreover, a client may use the "create" or "edit" message menu to cause an additional message to be sent to the cohort of dissatisfied participants, which additional message may include an apology, coupon or offer. Because the message can be crafted and sent in real time, dissatisfied participants may be able to use the coupon or offer to get a discount on the meal about which they complained, a result which is achievable only because of the "real time" capabilities of the present invention and one which is not achievable under any of the prior art systems or methods for client feedback.

Figure 13:
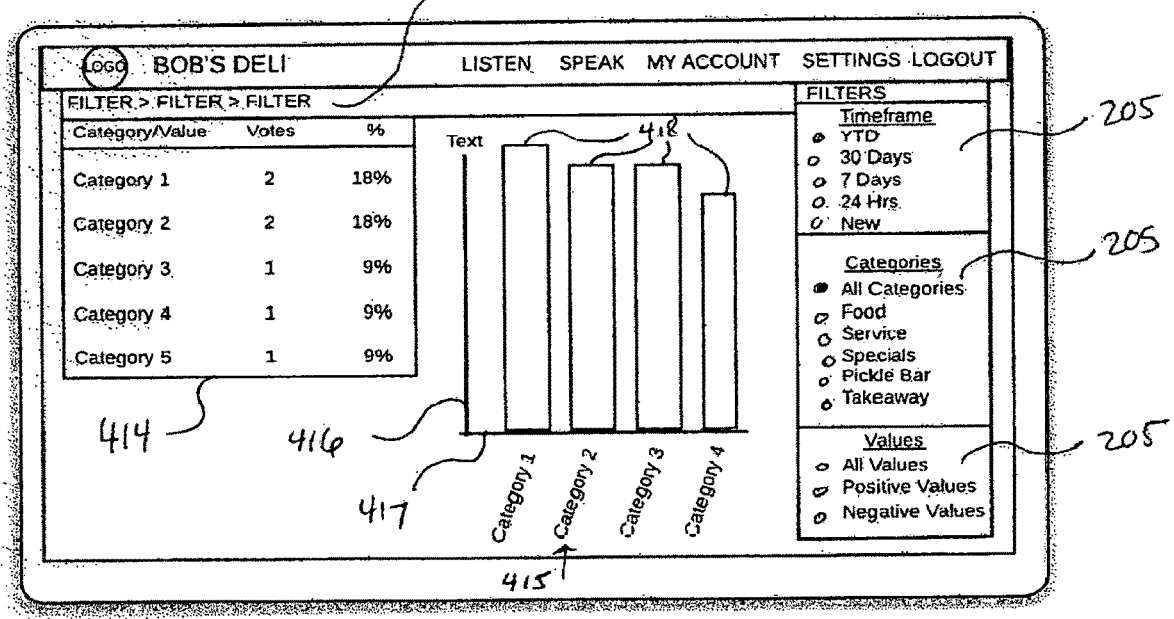
FIG. 13 is an example unique users page of an interactive client dashboard according to a preferred embodiment.

Referring now to FIG. 13, a "unique users" page according to a preferred embodiment is shown. Whereas in most cases multiple engagement data inputs submitted by the same participant is useful and desirable, as previously described, in some cases, such as polling or voting, a client may wish to collect no more than one value per category, or alternatively no more than one value total, from each unique user. A unique users page displays only the first engagement data input received from each unique user. Filters 205 are available to enable the client to limit or expand selected data for display, as previously described, and the filters selected 413 are shown just under the banner in addition to in the filters section 205. A chart 414 displays ranked categories (or values, according to the filters selected) with votes received and percentage votes for each. A bar graph 415 having a y axis 416 and x axis 417 displays vote data graphically according to filters selected; in the illustrated example, votes per category are shown with the height of each bar 418 representing relative numbers of votes received for that category. Y axis 416 may have tic marks with numbers reflecting number of votes received. X axis 417 is labeled by category (or value, or such other criteria according to filters selected) so the client can quickly and easily identify relative winners and losers. The unique users capabilities ideally are used by clients to collect polling or voting data in connection with sets of category/value lists designed accordingly, such as category "Best Documentary Film" with values corresponding to each documentary film in a film festival, for example. The unique users page would display each participant's first value selection for each category, preventing participants from voting multiple times. It should be apparent that the ability to prevent participants from voting more than once, and the ability to see data representing only the first vote cast by each participant, is a desirable and useful feature for voting and polling uses.

The particular embodiments described herein are provided by way of example and are not meant in any way to limit the scope of the claimed invention. It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

What is claimed is:

1. A method for collecting and displaying participant feedback about an event in real time, enabling a client to immediately respond, the method comprising, (a) providing to each of said participants a mobile application executable on a mobile device, said application in real-time communication with a data server and capable of receiving from said data server a set of selectable feedback parameters, displaying said set of selectable feedback parameters on said mobile device, and transmitting data from said mobile device to said data server, wherein said set of selectable feedback parameters comprises at least one category and at least two values associated with each said category, (b) allowing each of said participants to input a command via said mobile application by selecting from said selectable feedback parameters a category about which said participant wishes to give feedback and a value that indicates said participant's feedback in the moment about said event, (c) receiving on said data server feedback data from multiple participants, wherein said feedback data comprises at least said command data and a time stamp and wherein said time stamp captures the time said command data was input at a level of specificity of no longer than one minute, (d) aggregating and organizing in real time into a data structure said feedback data received from multiple participants, wherein said data structure organizes said feedback data by data analysis criteria and wherein at least one of said criteria is immediacy by time stamp, (e) providing to a client entity a software application executable on a client device in real-time communication with said data server and capable of receiving from said data server and displaying by immediacy in an interactive dashboard in real time said structured data from multiple participants, and (f) said software application receiving in real time said structured data from said data server, and (g) displaying in real time said structured data in said interactive dashboard by immediacy, wherein the range of said immediacy for display is selectably alterable by said client entity via said interactive dashboard, and wherein said interactive dashboard allows said client entity to alter the display of structured data in said interactive dashboard by selecting for display the desired data analysis criteria and range within said data analysis criteria.

2. The method of claim 1 wherein said interactive dashboard is capable of transmitting to said participant mobile device(s) messages created by said client entity.

3. The method of claim 2 wherein said messages are not pre-scripted but rather are manually created by said client entity in real time in response to structured data from multiple participants displayed in real time in said interactive dashboard.

4. The method of claim 2 wherein said messages are sent automatically upon the occurrence of certain triggers.

5. The method of claim 1 wherein said mobile application displays at least one list of selectable places about which a participant may submit feedback data.

6. The method of claim 5 wherein said mobile application displays at least one set of selectable categories corresponding to the place selected by said participant from said list of selectable places.

7. The method of claim 6 wherein said mobile application displays at least one set of selectable values associated with the category selected by said participant from said set of selectable categories.

8. The method of claim 1 wherein the identity of each participant remains anonymous.

9. The method of claim 1 wherein the mobile application command input by a participant transmits an encrypted identifier for such participant.

10. The method of claim 1 wherein said participant indicates feedback about the event by selecting one of two or more icons selectably displayed in the mobile application.

11. The method of claim 1 wherein the mobile application selectably displays at least one feedback value icon to be depressed by the participant at least one time in order to indicate the participant's feedback, wherein each said feedback value is a type of emotion.

12. The method of claim 11 wherein said participant's depressing the same feedback value icon more than once in a period of time ranging from 1 second to 1 minute indicates participant's intensity of emotion, where the greater the number of depressions the greater the intensity of emotion.

13. A system for collecting, displaying and responding to participant feedback about an event in real time, enabling a client entity to immediately respond, the system comprising a. a participant mobile application for a mobile device having wireless connectivity to the Internet, wherein each participant inputs a command that indicates such participant's feedback about the given event by selecting from a set of feedback parameters a feedback category and a feedback value, wherein each said feedback category is associated with at least two feedback values, and wherein said mobile application is capable of transmitting said command input to a data server in communication with a client software application and said mobile application, b. a non-virtual data processing apparatus that receives, organizes and aggregates the transmitted command input by each of multiple participants into a data structure according to data analysis criteria, wherein said data analysis criteria include immediacy by time stamp and criteria corresponding to said feedback parameters, resulting in structured participant command data, c. a client software application having an interactive dashboard capable of receiving continuously in real time structured participant command input data and displaying by immediacy said structured participant command input data in said interactive dashboard, d. wherein said client software application is capable of sending to participants, or certain subsets of participants, messages in real time, e. wherein said client software application enables said client entity to manually create custom messages in the moment in response to structured participant input data received, f. wherein said client software application enables automatic sending of messages to participants, or certain subsets of participants, upon occurrence of certain triggers, and g. wherein said client software application is capable of measuring performance of said messages and displaying said performance measurements on said interactive dashboard.

14. A system for anonymously measuring feedback about a given event occurring in real time by at least one participant, the system comprising:

(a) an encryption software that encrypts a unique identifier associated with each participant, (b) a participant mobile application for a mobile device having wireless connectivity to the Internet, wherein each participant inputs a command that indicates such participant's feedback about the given event, (c) a data server that receives the transmitted command input by each participant, and (d) a client software application having an interactive dashboard capable of receiving continuously in real time structured participant command input data and displaying by immediacy said command input data in said interactive dashboard, (e) wherein said data server aggregates and organizes according to data analysis criteria the command data generated by each participant, transmits structured command data to said client software application in real time, and wherein the identity of each participant remains anonymous.

15. A system for collecting, displaying and responding to participant feedback about an event in real time, enabling a client entity to immediately respond, the system comprising a. a participant mobile application for a mobile device having wireless connectivity to the Internet, wherein each participant inputs a command that indicates such participant's feedback about the given event by selecting from a set of feedback parameters a feedback category and a feedback value, wherein each said feedback category is associated with at least two feedback values, and wherein said mobile application is capable of transmitting said command input to a data server in communication with a client software application and said mobile application, b. a non-virtual data processing apparatus that receives, organizes and aggregates the transmitted command input by each of multiple participants into a data structure according to data analysis criteria, wherein said data analysis criteria include immediacy by time stamp and criteria corresponding to said feedback parameters, resulting in structured participant command data, c. a client software application having an interactive dashboard capable of receiving continuously in real time structured participant command input data and displaying by immediacy said structured participant command input data in said interactive dashboard, d. wherein said client software application is capable of sending to participants, or certain subsets of participants, messages in real time, e. wherein said client software application enables said client entity to manually create and store for future use messages for sending to certain subsets of participants in response to structured participant input data received, f. wherein said client software application enables automatic sending of messages to participants, or certain subsets of participants, upon occurrence of certain triggers, and g. wherein said client software application is capable of measuring performance of said messages and displaying said performance measurements on said interactive dashboard.

\* \* \* \* \*